(12) United States Patent
Shorney et al.

(10) Patent No.: US 7,258,184 B2
(45) Date of Patent: Aug. 21, 2007

(54) BATTERY REPLACEMENT SYSTEM FOR AN INDUSTRIAL TRUCK

(75) Inventors: Andrew Shorney, Hants (GB); Paul John Eckersley, Hants (GB); Keith Francis Messer, Hants (GB)

(73) Assignee: Linde Aktiengesellschaft, Wiesbaden (DE)

( * ) Notice: Subject to any disclaimer, the term of this patent is extended or adjusted under 35 U.S.C. 154(b) by 364 days.

(21) Appl. No.: 10/984,689

(22) Filed: Nov. 9, 2004

(65) Prior Publication Data

US 2005/0121241 A1 Jun. 9, 2005

(30) Foreign Application Priority Data

Nov. 10, 2003 (GB) .................................. 0326176.5

(51) Int. Cl.
*B65G 7/04* (2006.01)
(52) U.S. Cl. .................... 180/68.5; 180/65.1; 414/397; 414/398
(58) Field of Classification Search ............... 180/65.1, 180/68.5; 414/397, 398
See application file for complete search history.

(56) References Cited

U.S. PATENT DOCUMENTS

| 3,259,365 | A | * | 7/1966 | Gibson ........................ 254/95 |
| 4,101,038 | A | * | 7/1978 | Palma ......................... 104/34 |
| 4,227,463 | A | * | 10/1980 | Pfleger ........................ 104/34 |
| 5,297,645 | A | * | 3/1994 | Eckersley et al. .......... 180/68.5 |
| 5,549,443 | A | * | 8/1996 | Hammerslag ................ 414/809 |
| 5,711,648 | A | * | 1/1998 | Hammerslag ................ 414/800 |
| 5,927,938 | A | * | 7/1999 | Hammerslag ................ 414/809 |
| 6,189,636 | B1 | * | 2/2001 | Kikukawa ................... 180/68.5 |
| 6,345,677 | B1 | * | 2/2002 | Eckersley et al. .......... 180/68.5 |
| 6,474,429 | B1 | * | 11/2002 | Nishio ........................ 180/68.5 |
| 6,637,807 | B2 | * | 10/2003 | Gotz ..................... 296/203.01 |
| 7,070,225 | B2 | * | 7/2006 | Herrmann ................. 296/146.6 |
| 2004/0173408 | A1 | * | 9/2004 | Szymanski et al. ......... 187/222 |
| 2005/0008465 | A1 | * | 1/2005 | Szymanski et al. ......... 414/522 |
| 2005/0036861 | A1 | * | 2/2005 | Buchmann et al. ......... 414/398 |
| 2005/0092536 | A1 | * | 5/2005 | Takeda ....................... 180/68.5 |
| 2005/0255377 | A1 | * | 11/2005 | Kondo ....................... 429/100 |
| 2005/0278920 | A1 | * | 12/2005 | Bogelein ................... 29/401.1 |

FOREIGN PATENT DOCUMENTS

JP 2002265191 A * 9/2002

* cited by examiner

*Primary Examiner*—Jeff Restifo
(74) *Attorney, Agent, or Firm*—The Webb Law Firm

(57) ABSTRACT

A battery replacement system for an industrial truck has an electrical propulsion drive and at least one battery compartment for holding a battery block. The battery block can be moved essentially in a horizontal direction into the battery compartment or out of the battery compartment. An external holding apparatus independent of the industrial truck is provided for the battery block. The industrial truck can be maneuvered over the holding apparatus such that the holding apparatus is positioned beneath the battery compartment. The battery block located within the battery compartment can be lifted slightly by the holding apparatus. The force required to lift the battery block can be produced by the electrical propulsion drive.

12 Claims, 5 Drawing Sheets

BATTERY REPLACEMENT SYSTEM FOR AN INDUSTRIAL TRUCK

CROSS-REFERENCE TO RELATED APPLICATION

This application claims priority to British Application No. 0326176.5 filed Nov. 10, 2003, which is herein incorporated by reference in its entirety.

BACKGROUND OF THE INVENTION

1. Field of the Invention

The invention relates to a battery replacement system for an industrial truck having the following general features:
the industrial truck has an electrical propulsion drive,
the industrial truck has at least one battery compartment for holding a battery block,
the battery block can be moved essentially in the horizontal direction into the battery compartment or out of the battery compartment, and
an external holding apparatus, which is independent of the industrial truck, is provided for the battery block.

2. Technical Considerations

Electrically powered industrial trucks are equipped with battery blocks which contain rechargeable batteries and can be charged either in the industrial truck or outside the industrial truck. If the charging process is carried out outside the industrial truck, the discharged battery block is removed from the industrial truck and can be replaced immediately by a freshly charged battery block. This allows the industrial truck to be used virtually around the clock. During the replacement process and during charging, the battery block is generally located on a holding apparatus which is matched to the battery block.

The battery block for an industrial truck can be replaced by means of a crane if the battery compartment is open at the top and the frame of the industrial truck and the fittings on it are designed appropriately. It is also known for the battery compartment to be provided with a side or front opening, through which the battery block can be pushed essentially in the horizontal direction out of the industrial truck. This horizontal removal of the battery block may, for example, be carried out by means of a lifting trolley equipped with an appropriate holding apparatus. It is also known for a roller path to be positioned alongside the opening in the battery compartment, onto which the battery block can then be pushed by hand or by means of an auxiliary apparatus.

Particularly in the case of relatively large industrial trucks having a correspondingly heavy battery block, manual movement of the battery block has been found to be difficult and dangerous. If auxiliary mechanical apparatuses are used to move the battery block, they must be able to apply a sufficiently high drive force and need to be designed in a correspondingly complex manner. This is true, in particular, when the battery block is anchored within the battery compartment such that the battery block must be lifted slightly in order to be able to subsequently move it horizontally.

The present invention is thus based on the object of providing a battery replacement system of the type mentioned initially but having a holding apparatus of simple design.

SUMMARY OF THE INVENTION

The invention provides a battery replacement system for an industrial truck comprising the following features:
the industrial truck can be maneuvered over a holding apparatus such that the holding apparatus is positioned beneath the battery compartment. In the process, the industrial truck is moved over the holding apparatus such that the holding apparatus can lift the battery block from underneath. During this process, the wheels of the industrial truck are still in contact with the roadway, while the holding apparatus is likewise located on the roadway.

the battery block, which is located within the battery compartment, is lifted slightly by means of the holding apparatus. In addition to lifting the battery block, its weight is completely supported on the holding apparatus. If, for example, the battery compartment has a step in the lower area in order to prevent the battery block from sliding during operation, the battery block can be lifted over this step using the holding apparatus. After being lifted, the battery block can be relocated in at least one direction horizontally relative to the industrial truck.

the force required to lift the battery block can be produced by means of the electrical propulsion drive of the industrial truck. A unit which is present in the industrial truck, in any case, is thus used to lift the battery block. There is, therefore, no need for any additional actuating element for lifting the battery block.

It is particularly advantageous for the holding apparatus to have an inclined path arranged such that it makes contact with the battery block while the holding apparatus is being moved with the industrial truck, and lifts the battery block as a consequence of the propulsion movement of the industrial truck. The industrial truck, which is moved by its own propulsion drive, thus pushes the battery block onto the inclined path on the holding apparatus. The battery block is thus lifted to the height of the upper end of the inclined path.

The friction that occurs between the battery block and the holding apparatus can be minimized by the inclined path being in the form of a roller path.

It is advantageous for there to be a horizontal section adjacent to the upper end of the inclined path. The battery block can thus be aligned horizontally once again in the lifted position, once it has been pushed onto this horizontal section.

The holding apparatus expediently has a means, which acts in the horizontal direction, for locking the battery block on the holding apparatus. The battery block can thus be fixed on the holding apparatus. The industrial truck can then be moved away from the holding apparatus, with the battery block locked on it. Power supply for the industrial truck can, in this case, still be provided by the battery block that is located on the holding apparatus, provided that it remains connected to the industrial truck, for example by means of an extension cable.

The means for locking the battery block on the holding apparatus can be operated as required. An operator or person carrying out servicing work can thus operate the means for locking the battery block, for example by hand, and can release it again.

Furthermore, the industrial truck has a means, which acts in the horizontal direction, for locking the battery block on the industrial truck. This means for locking the battery block on the industrial truck secures the battery block during operation of the industrial truck, particularly against movement in the horizontal direction. This means can be released before the battery block is removed from the industrial truck.

In one particularly expedient arrangement, the means for locking the battery block on the industrial truck can be activated by the weight of the battery block, which is supported on the industrial truck. The means for locking the battery block on the industrial truck can, for example, be formed by a hook mounted such that it can pivot, and which can be pivoted to a specific position by the weight of the battery block located in the battery compartment, and is thus activated. When the battery block is lifted within the battery compartment, the lever pivots back to a position in which it is not active, that is to say allowing horizontal movement of the battery block.

The means for locking the battery block on the industrial truck can be activated by means of a control element arranged on the holding apparatus and can be operated as required, while the holding apparatus is moved at least partially with the industrial truck. The control element, which can be operated as required, allows the means for locking the battery block on the industrial truck to be activated even when the weight of the battery block is not supported on the industrial truck. This is advantageous when a battery block located on the holding apparatus is intended to be inserted into the battery compartment of the industrial truck. During this process, the industrial truck is moved over the holding apparatus with the battery block, the means for locking the battery block on the industrial truck is activated by means of the control element, and the industrial truck is then moved away from the holding apparatus, together with the battery block fixed in it.

The means for locking the battery block on the holding apparatus and/or the control element which can be operated as required for activation of the means for locking the battery block on the industrial truck can particularly advantageously be operated remotely from the industrial truck. This allows the process of replacing the battery (with the exception of releasing and making the electrical connections) to be carried out completely by an operator seated on the industrial truck.

In a preferred application, the holding apparatus is arranged in a fixed position. The holding apparatus is thus part of a stationary charging station. The relative movements that are required between the industrial truck and the holding apparatus in order to replace the battery block are carried out exclusively by the industrial truck, by means of its propulsion drive.

In order to replace the battery block, the holding apparatus can be moved with the industrial truck and in its longitudinal direction. In this case, the battery block can be removed from the battery compartment in the longitudinal direction of the industrial truck. In the process, the industrial truck moves in its main direction of travel.

While moving, the holding apparatus is located between the columns of a lifting framework on the industrial truck. The lifting framework is, in this case, designed to be broad enough that the holding apparatus, together with the battery block, can be moved relative to the industrial truck between the lifting framework columns.

The present invention, likewise, includes an industrial truck and a holding apparatus for use in the battery replacement system described above.

BRIEF DESCRIPTION OF THE DRAWINGS

Further advantages and details of the invention will be explained in more detail with reference to the exemplary embodiment which is illustrated in the schematic figures, in which.

DESCRIPTION OF THE PREFERRED EMBODIMENTS

Figure 1:
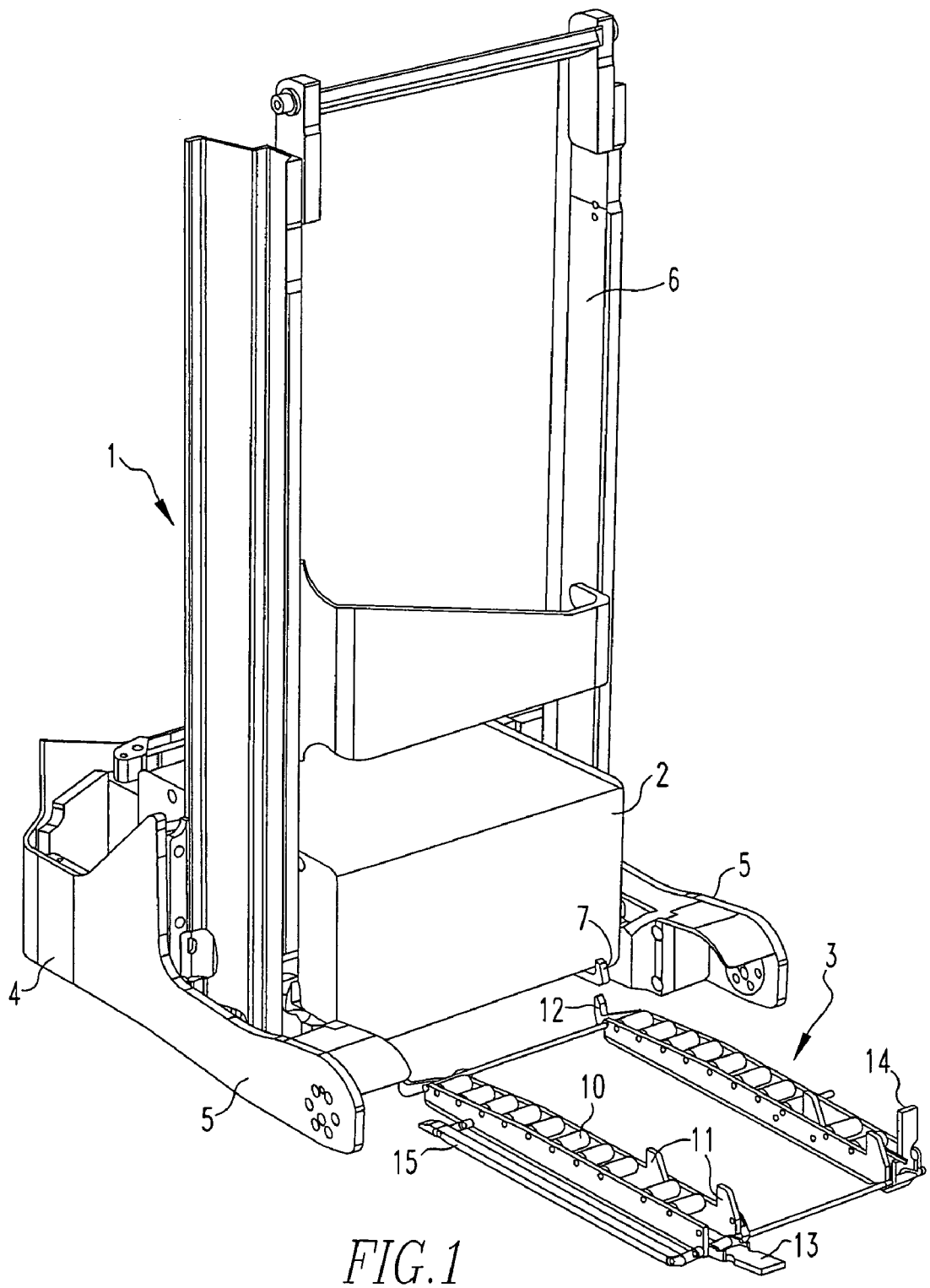
FIG. 1 shows a battery replacement system according to the invention.

FIG. 1 shows a battery replacement system according to the invention depicting an industrial truck 1, a battery block 2 is arranged in a battery compartment in the industrial truck 1 and movable in its longitudinal direction, and an external holding apparatus 3 for the battery block 2. The industrial truck 1, which is in the form of a fork lift truck, is illustrated only partially in order to assist clarity. The illustration shows a vehicle frame 4 with wheel arms 5 for attachment of two bogie wheels. A lifting framework 6 is arranged such that the two columns of the lifting framework 6 are located at the sides of the battery block 2. A means 7 for locking the battery block 2 on the industrial truck 1, which can be in the form of a hook that can pivot, secures the battery block 2 against sliding horizontally forward. When the means 7 for locking the battery block 2 on the industrial truck 1 is not activated, that is to say the hook is pivoted downwardly, the battery block 2 can be shifted forward relative to the industrial truck 1, starting from the illustrated operating position, that is to say in the direction of the holding apparatus 3.

The holding apparatus 3 has a roller path 10 and a stop 11 for the battery block 2. A means 12 for locking the battery block 2 on the holding apparatus 3 can be operated by means of a control element 13. Furthermore, a control element 14 is provided on the holding apparatus 3 for activation of the means 7 for locking the battery block 2 on the industrial truck 1. This control element 14 can be used to move two sliding rails 15 upwardly and downwardly. The means 7 for locking the battery block 2 on the industrial truck 1 can thus be activated or deactivated when the industrial truck 1 has been moved at least partially over the holding apparatus 3.

Figure 2:
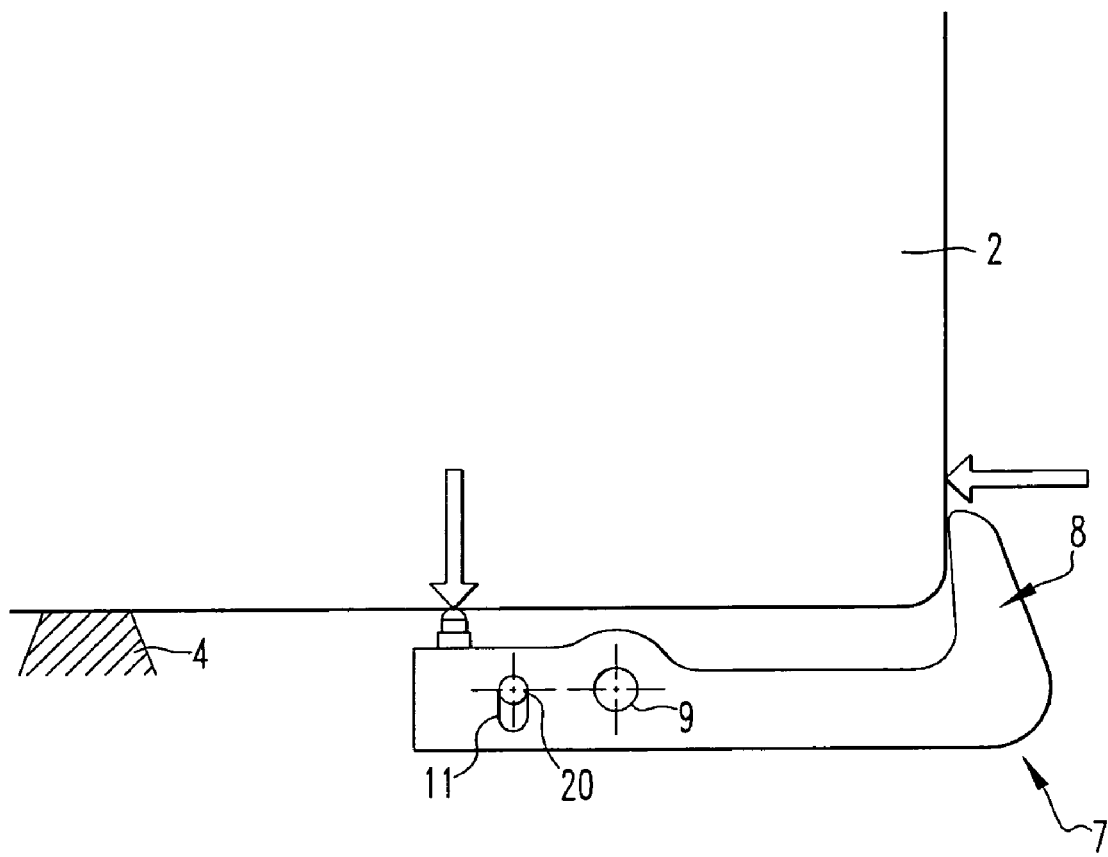
FIG. 2 shows a means for locking the battery block on the industrial truck.

FIG. 2 shows details of the means 7 for locking the battery block 2 on the industrial truck 1. When the battery block 2 is in the illustrated vertical position, it is located within the battery compartment, on the frame 4 of the industrial truck 1. This corresponds to the position of the battery block 2 during operation of the industrial truck 1. The means 7 for locking the battery block 2 on the industrial truck 1 has a hook 8 which is mounted on the frame 4 such that it can pivot about the shaft 9. A pin 20, which is attached to the frame 4, is located in an elongated hole 41 in the hook 8, and thus defines the pivoting range of the hook 8. When the battery block 2 is in the illustrated position, the weight of the battery block 2 presses the hook 8 downwardly on its left-hand side so that the right-hand side of the hook 8 is raised and prevents the battery block 2 from moving to the right in the plane of the drawing. If the battery block 2 is now lifted, the hook 8 is tilted in the clockwise direction, owing to the eccentric arrangement of the shaft 9, so that the right-hand end of the hook 8 is located underneath the battery block 2. The battery block 2 can then be moved to the right in the plane of the drawing.

Figure 3:
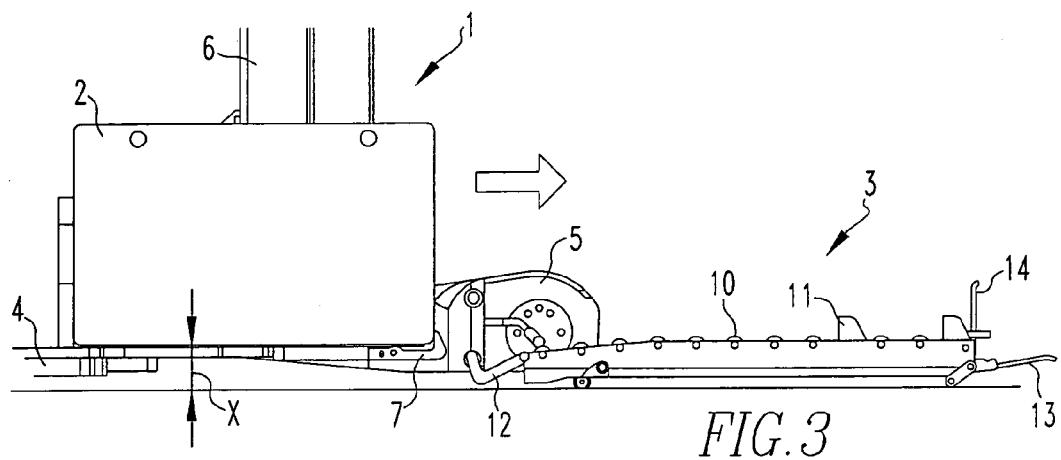
FIGS. 3-5 show the battery replacement system during removal of a battery block.
Figure 4:
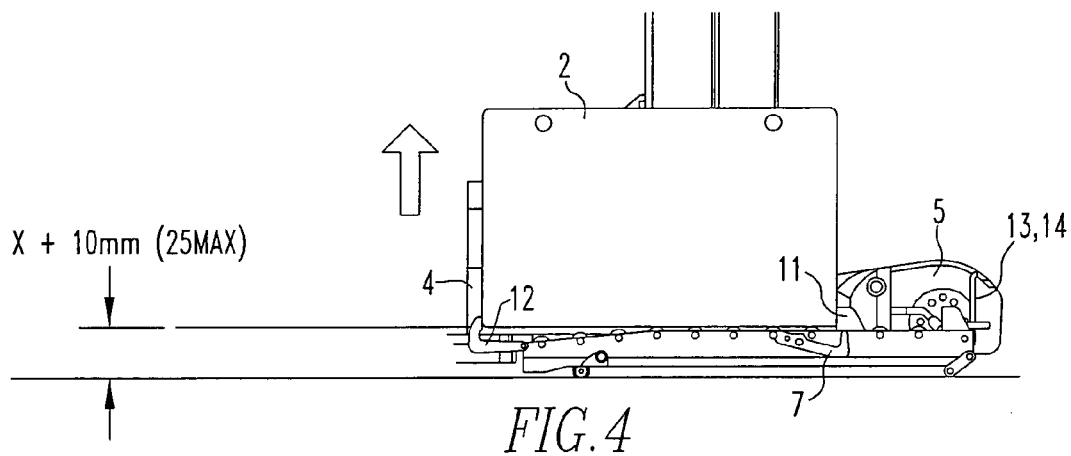
Figure 5:
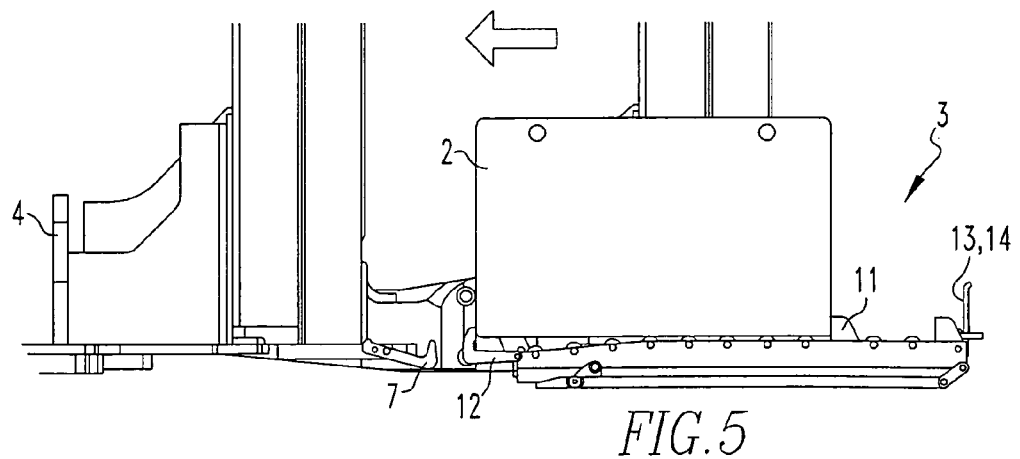

FIGS. 3-5 show the battery replacement system during removal of the battery block 2 from the industrial truck 1.

In the arrangement shown in FIG. 3, the industrial truck 1 is located with the battery block 2 (which is located completely within the battery compartment) directly in front of the holding apparatus 3. The battery block 2 is locked by the means 7 for locking the battery block 2 within the battery compartment. The battery block 2 is, in this case, at a distance x from the roadway surface.

In order to remove the battery block 2, the industrial truck 1 is now moved completely over the holding apparatus 3. This position of the industrial truck 1 is illustrated in FIG. 4. The weight of the battery block 2 is, in this case, supported completely by the roller path 10 on the holding apparatus 3. The roller path 10, which is arranged such that it is inclined in the left-hand area of the drawing, lifts the battery block 2 through 10 to 25 millimeters (mm) in comparison to its position as illustrated in FIG. 3. This amount varies, for example, as a function of the wear and, thus, of the diameter of the wheels of the industrial truck 1. This slight lifting of the battery block 2 deactivates the means 7 for locking the battery block 2 on the industrial truck 1. The means 12 for locking the battery block 2 on the holding apparatus 3 is activated by operating the control element 13.

The industrial truck 1 is then moved away from the holding apparatus 3, without the battery block 2, as is illustrated in FIG. 5. During this process, electrical power can still be supplied to the industrial truck 1 by the battery block 2, provided that the electrical connection is extended by means of an extension cable.

Figure 6:
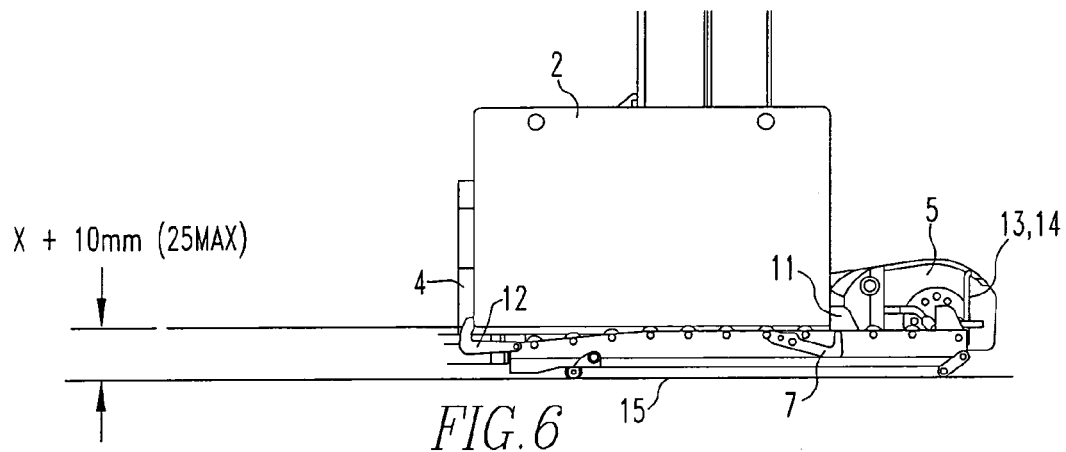
FIGS. 6-8 show the battery replacement system after the insertion of a battery block.
Figure 7:
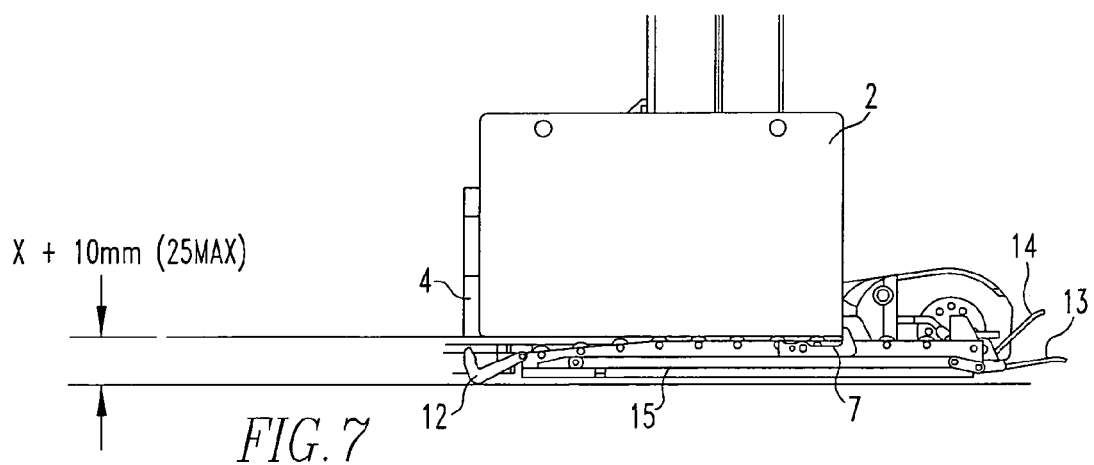
Figure 8:
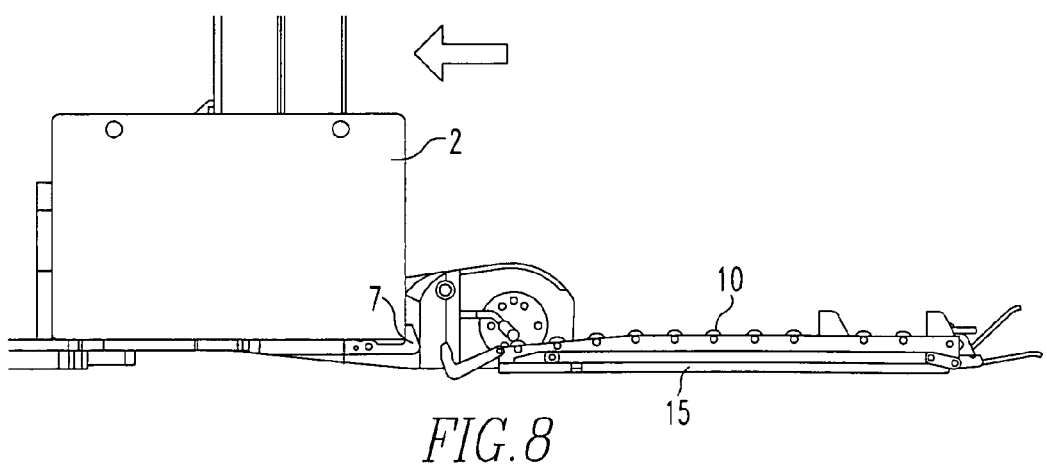

FIGS. 6-8 illustrate the procedure for insertion of the battery block 2 into the industrial truck 1.

First of all, in the arrangement shown in FIG. 6, the battery block 2 is still locked by the means 12 on the holding apparatus 3. The hook 8, which forms the means 7 for locking the battery block 2 on the industrial truck 1, is folded downwardly, that is to say it is not activated.

The two control elements 13 and 14 are then operated, and this corresponds to the arrangement shown in FIG. 7. Operation of the control element 13 results in the means 12 for locking the battery block 2 on the holding apparatus 3 being folded downwardly. This, therefore, releases the lock for the battery block 2 on the holding apparatus 3. Operation of the control element 14 lifts the two sliding rails 15, which move the means 7 for locking the battery block 2 on the industrial truck 1 to an active position.

If, as is illustrated in FIG. 8, the industrial truck 1 is then moved away from the holding apparatus 3, the battery block 2 is taken with it by the locking means 7. During this process, the locking means 7 remains activated by the sliding rails 15 until the battery block 2 has been lowered on the inclined section of the roller path 10, and the weight of the battery block 2 acts on the locking means 7, thus activating this locking means 7.

Figure 9:
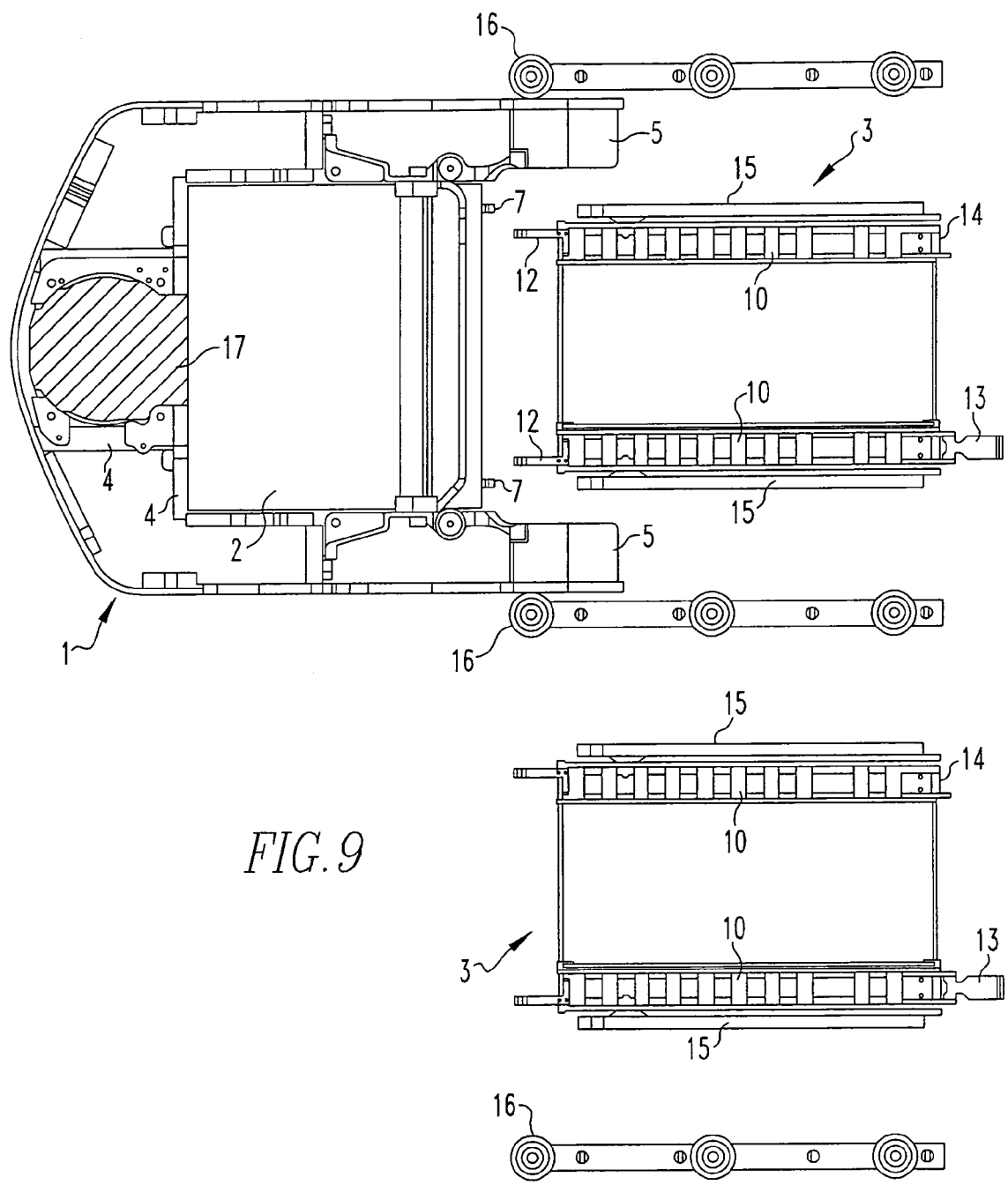
FIG. 9 shows a battery replacement system with two holding apparatuses.

FIG. 9 shows a plan view of a battery replacement system according to the invention having two holding apparatuses 3. This arrangement allows a discharged battery block 2 to be removed on a first holding apparatus 3 and then allows a freshly charged battery block 2 to be picked up by the second holding apparatus 3 without any waiting time. Guidance rollers 16 allow the industrial truck 1 to be positioned exactly in its lateral direction, thus making it easier for the operator to replace the battery. The propulsion drive 17 for the industrial truck 1 can be formed by an electric motor, which is connected to a drive wheel via a transmission system.

The illustrated arrangement may, for example, be combined with a crane system or with a horizontal transfer system for transporting the battery blocks further. The control elements 13, 14 may be designed to be purely mechanical, or else may be coupled to electrical, pneumatic or hydraulic actuating elements. Instead of the electrical link from the battery blocks 2 to the industrial truck 1 via connecting cables, automatic contact-making can also be provided, for example via electrical contacts arranged on the battery block 2 and on the industrial truck 1.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A battery replacement system for an industrial truck comprises the following features:

an industrial truck having an electrical propulsion drive;
the industrial truck including at least one battery compartment for holding a battery block;
the battery block movable in a horizontal direction into the battery compartment or out of the battery compartment; and
an external holding apparatus, which is independent of the industrial truck, and provided for the battery block,
wherein the industrial truck is maneuverable over the holding apparatus such that the holding apparatus can be positioned beneath the battery compartment,
wherein the battery block, when located within the battery compartment, can be lifted by means of the holding apparatus,
wherein a force required to lift the battery block can be produced by the electrical propulsion drive of the industrial truck, and
wherein the holding apparatus has an inclined path arranged such that the path makes contact with the battery block during relative movement of the industrial truck with respect to the holding apparatus such that the path lifts the battery block as a consequence of the propulsion movement of the industrial truck.

2. The battery replacement system according to claim 1, wherein the inclined path is a roller path.

3. The battery replacement system according to claim 1, including a horizontal section adjacent to an upper end of the inclined path.

4. The battery replacement system according to claim 1, wherein the holding apparatus includes a means for locking the battery block on the holding apparatus, which locking means acts in a horizontal direction.

5. The battery replacement system according to claim 4, wherein the means for locking the battery block on the holding apparatus can be operated as required.

6. The battery replacement system according to claim 1, wherein the industrial truck includes a means for locking the battery block on the industrial truck, which locking means acts in a horizontal direction.

7. The battery replacement system according to claim 6, wherein the means for locking the battery block on the industrial truck can be activated by the weight of the battery block supported on the industrial truck.

8. The battery replacement system according to claim 6, wherein the means for locking the battery block on the industrial truck can be activated by a control element arranged on the holding apparatus and can be operated as required, while the holding apparatus is positioned at least partially beneath the industrial truck.

9. The battery replacement system according to claim 8, wherein the means for locking the battery block on the holding apparatus and/or the control element which can be operated as required for activation of the means for locking the battery block on the industrial truck can be operated remotely from the industrial truck.

10. The battery replacement system according to claim 1, wherein the holding apparatus is arranged in a fixed position.

11. The battery replacement system according to claim 1, wherein the industrial truck can be maneuvered over the holding apparatus in a longitudinal direction.

12. The battery replacement system according to claim 11, wherein, during movement, the holding apparatus is located between columns of a lifting framework on the industrial truck.

* * * * *